US011359691B2

(12) United States Patent
Takaesu et al.

(10) Patent No.: US 11,359,691 B2
(45) Date of Patent: Jun. 14, 2022

(54) VIBRATION DAMPING DEVICE FOR VEHICLE

(71) Applicant: HONDA MOTOR CO., LTD., Tokyo (JP)

(72) Inventors: Keita Takaesu, Saitama (JP); Seiji Hayakawa, Saitama (JP); Naoki Sogawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 17/064,748

(22) Filed: Oct. 7, 2020

(65) Prior Publication Data

US 2021/0108700 A1 Apr. 15, 2021

(30) Foreign Application Priority Data

Oct. 11, 2019 (JP) .............................. JP2019-188151

(51) Int. Cl.
  *F16F 13/10* (2006.01)
  *B60K 5/12* (2006.01)

(52) U.S. Cl.
  CPC .......... *F16F 13/107* (2013.01); *B60K 5/1208* (2013.01)

(58) Field of Classification Search
  CPC ...... B60K 5/1208; F16F 13/707; F16F 13/30; F16F 13/102; F16F 13/10; F16F 2224/041; F16F 2224/025
  See application file for complete search history.

(56) References Cited

U.S. PATENT DOCUMENTS

| | | | | |
|---|---|---|---|---|
| 4,836,512 A | * | 6/1989 | Lun | F16F 13/107 248/559 |
| 5,028,039 A | * | 7/1991 | Sato | F16F 13/30 267/140.14 |
| 6,053,487 A | | 4/2000 | Yotani et al. | |
| 8,120,840 B1 | * | 2/2012 | Choi | G06F 3/016 359/296 |

FOREIGN PATENT DOCUMENTS

| | | | |
|---|---|---|---|
| DE | 3731479 A1 | * | 4/1989 |
| GB | 2325720 A | * | 12/1998 |
| JP | H094676 A | | 1/1997 |

(Continued)

OTHER PUBLICATIONS

Notice of Reasons for Refusal for Patent Application JP 2019-188151; 10 pp.

*Primary Examiner* — Pamela Rodriguez
(74) *Attorney, Agent, or Firm* — Armstrong Teasdale LLP (57) ABSTRACT

A vibration damping device for a vehicle includes: a first attachment member attached to a first member; a second attachment member attached to a second member; a first liquid chamber and a second liquid chamber configured to change volumes according to relative displacement between the first attachment member and the second attachment member; and an orifice passage configured to cause a liquid to flow between the first liquid chamber and the second liquid chamber according to changes in the volumes of the first liquid chamber and the second liquid chamber. The orifice passage is curved at least partially in an axial direction thereof, and the liquid contains a non-Newtonian fluid whose viscosity decreases as a shear rate increases.

8 Claims, 6 Drawing Sheets

(56) References Cited

FOREIGN PATENT DOCUMENTS

| | | | |
|---|---|---|---|
| JP | H10252807 | A | 9/1998 |
| JP | H10325445 | A | 12/1998 |
| JP | 2004324823 | A | 11/2004 |
| JP | 2007231241 | A | 9/2007 |
| JP | 2009127780 | A | 6/2009 |

* cited by examiner

VIBRATION DAMPING DEVICE FOR VEHICLE

TECHNICAL FIELD

The present invention relates to a vibration damping device for a vehicle.

BACKGROUND ART

A known vibration damping device for a vehicle damps vibration by causing a liquid to flow between plural liquid chambers via an orifice passage (for example, JP2004-324823A). Regarding such a vibration damping device, it is known that vibration damping characteristics improve as an average flow velocity of the liquid increases when the so-called liquid column resonance occurs.

In order to enhance the vibration damping effect of the vibration damping device, it is desirable to make the orifice passage as long as possible. In a case where the orifice passage is curved, the orifice passage can be made longer as compared with a case where the orifice passage extends straight. However, if the orifice passage is curved, a centrifugal force is applied to the liquid flowing through the orifice passage. Consequently, not only a primary flow of the liquid toward an axial direction of the orifice passage but also a secondary flow of the liquid toward an outside in a radial direction of the orifice passage is generated in the orifice passage. If a flow of the liquid is disturbed by the secondary flow, the average flow velocity of the liquid decreases. Accordingly, the vibration damping characteristics of the vibration damping device may not be sufficiently exhibited when the liquid column resonance occurs.

SUMMARY OF THE INVENTION

In view of such a problem of the prior art, a primary object of the present invention is to provide a vibration damping device for a vehicle that can prevent a flow of a liquid from being disturbed by a centrifugal force and thus sufficiently secure an average flow velocity of the liquid even if an orifice passage is curved.

To achieve such an object, one embodiment of the present invention provides a vibration damping device (1) for a vehicle, including: a first attachment member (5) attached to a first member (2); a second attachment member (6) attached to a second member (3); a first liquid chamber (10) and a second liquid chamber (11) configured to change volumes according to relative displacement between the first attachment member and the second attachment member; and an orifice passage (12) configured to cause a liquid (M) to flow between the first liquid chamber and the second liquid chamber according to changes in the volumes of the first liquid chamber and the second liquid chamber, wherein the orifice passage is curved at least partially in an axial direction thereof, and the liquid contains a non-Newtonian fluid whose viscosity decreases as a shear rate increases.

According to this arrangement, it is possible to prevent the flow of the liquid from being disturbed by the centrifugal force and thus to sufficiently secure the average flow velocity of the liquid even if the orifice passage is curved. Accordingly, the vibration damping characteristics of the vibration damping device can be sufficiently exhibited when the liquid column resonance occurs.

In the above arrangement, preferably, the orifice passage is provided spirally.

According to this arrangement, the length of the orifice passage in the axial direction can be secured more easily as compared with a case where the substantially entire orifice passage is provided on a same plane. Accordingly, the vibration damping effect of the vibration damping device can be enhanced.

In the above arrangement, preferably, the substantially entire orifice passage is provided on a same plane.

According to this arrangement, the installation space of the orifice passage can be reduced as compared with a case where the orifice passage is provided spirally. Accordingly, it is possible to make the vibration damping device compact.

In the above arrangement, preferably, the orifice passage is curved over a substantially entire area in the axial direction thereof.

According to this arrangement, the length of the orifice passage in the axial direction can be secured more easily as compared with a case where the orifice passage is curved only partially. Accordingly, the vibration damping effect of the vibration damping device can be enhanced.

In the above arrangement, preferably, the vibration damping device further includes: an elastically deformable first wall (7) partially defining the first liquid chamber and configured to support the first attachment member; an elastically deformable second wall (8) partially defining the second liquid chamber and attached to the second attachment member; and a partition wall (9) coupled to the first wall so as to separate the second liquid chamber from the first liquid chamber and provided with the orifice passage.

According to this arrangement, the vibration damping effect of the vibration damping device can be enhanced.

In the above arrangement, preferably, the orifice passage is partially defined by an outer circumferential groove (27) provided on an outer circumferential surface of the partition wall.

According to this arrangement, the length of the orifice passage in the axial direction can be secured more easily as compared with a case where the orifice passage is provided in an inner circumferential portion of the partition wall. Accordingly, the vibration damping effect of the vibration damping device can be further enhanced.

In the above arrangement, preferably, the non-Newtonian fluid is a thixotropic fluid.

According to this arrangement, the viscosity of the non-Newtonian fluid can be gradually decreased as the shear rate increases. Accordingly, it is possible to prevent the vibration damping characteristics of the vibration damping device from changing sharply.

In the above arrangement, preferably, the liquid is composed only of the non-Newtonian fluid.

In the above arrangement, preferably, the liquid is composed of both the non-Newtonian fluid and a Newtonian fluid.

Thus, according to the above arrangements, it is possible to provide a vibration damping device for a vehicle that can prevent a flow of a liquid from being disturbed by a centrifugal force and thus sufficiently secure an average flow velocity of the liquid even if an orifice passage is curved.

DESCRIPTION OF THE PREFERRED EMBODIMENT(S)

In the following, with reference to the drawings, a liquid filled engine mount 1 (an example of a vibration damping device for a vehicle) according to an embodiment of the present invention will be described. Arrows U and Lo appropriately shown in the respective drawings indicate an upper side and a lower side of the engine mount 1, respectively.

<The Structure of the Engine Mount 1>

Figure 1:
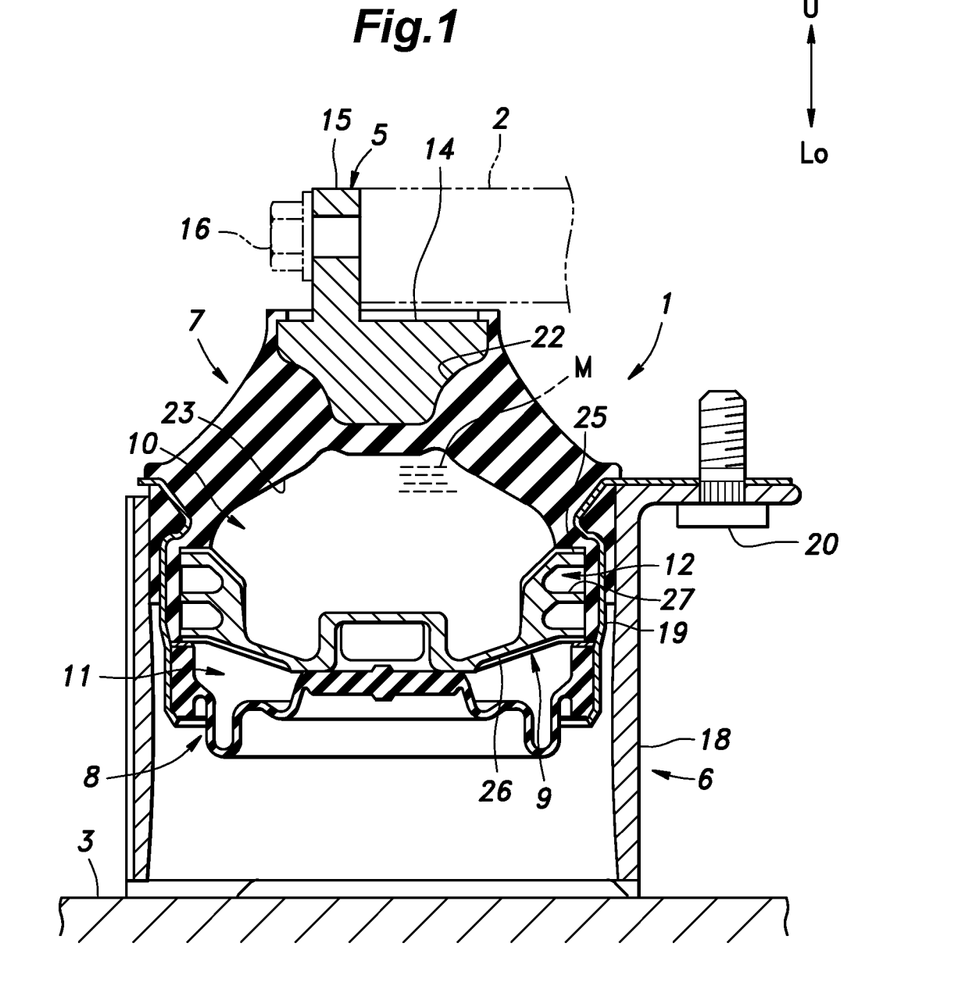
FIG. 1 is a cross-sectional view of an engine mount according to an embodiment of the present invention.

With reference to FIG. 1, the engine mount 1 is provided between an internal combustion engine 2 (an example of a first member) and a vehicle body 3 (an example of a second member) in a vehicle such as an automobile. The engine mount 1 is a component for supporting the engine 2 while damping the vibration thereof.

The engine mount 1 includes a first attachment member 5 attached to the engine 2, a second attachment member 6 attached to the vehicle body 3, a first wall 7 provided between the first attachment member 5 and the second attachment member 6, a second wall 8 provided below the first wall 7, a partition wall 9 provided between the first wall 7 and the second wall 8, a first liquid chamber 10 provided above the partition wall 9, a second liquid chamber 11 provided below the partition wall 9, and an orifice passage 12 provided on an outer circumference of the partition wall 9. In the following, these components of the engine mount 1 will be described one by one.

The first attachment member 5 of the engine mount 1 is located at an upper end of the engine mount 1. The first attachment member 5 includes an engagement portion 14 and an attachment portion 15 that protrudes upward from an upper surface of the engagement portion 14. The attachment portion 15 is attached to the engine 2 by a bolt 16.

The second attachment member 6 of the engine mount 1 is located at a lower portion of the engine mount 1. The second attachment member 6 includes an outer cylinder 18 and an inner cylinder 19 that is provided on an inner circumferential side of the outer cylinder 18. An upper end of the outer cylinder 18 and an upper end of the inner cylinder 19 are attached to each other by a bolt 20. A lower portion of the outer cylinder 18 is attached to the vehicle body 3 by a bolt (not shown).

The first wall 7 of the engine mount 1 is made of rubber and is elastically deformable. An upper recess 22 that opens upward is provided in an upper portion of the first wall 7. The engagement portion 14 of the first attachment member 5 is engaged with (fits into) the upper recess 22. Accordingly, the first wall 7 supports the first attachment member 5 from below. A lower recess 23 that opens downward is provided in a lower portion of the first wall 7.

The second wall 8 of the engine mount 1 consists of the so-called diaphragm. The second wall 8 is made of rubber and is elastically deformable. An outer circumferential portion of the second wall 8 is engaged with a lower inner circumference of the inner cylinder 19 of the second attachment member 6. Thus, the second wall 8 is attached to the second attachment member 6.

The partition wall 9 of the engine mount 1 separates the second liquid chamber 11 from the first liquid chamber 10. The partition wall 9 includes a cylindrical circumferential wall 25 and a bottom wall 26 that covers a lower end of the circumferential wall 25. The circumferential wall 25 is engaged with (fits into) the lower recess 23 of the first wall 7. Accordingly, the partition wall 9 is coupled to the first wall 7. A spiral outer circumferential groove 27 is provided on an outer circumferential surface of the circumferential wall 25.

The first liquid chamber 10 of the engine mount 1 is a chamber defined by the lower recess 23 of the first wall 7 and the partition wall 9. Namely, the first liquid chamber 10 is a chamber partially defined by the first wall 7. The first liquid chamber 10 holds (is filled with) a mount liquid M (an example of a liquid).

The second liquid chamber 11 of the engine mount 1 is provided below the first liquid chamber 10. The second liquid chamber 11 is a chamber defined by the second wall 8 and the partition wall 9. Namely, the second liquid chamber 11 is a chamber partially defined by the second wall 8. The second liquid chamber 11 holds (is filled with) the mount liquid M.

The orifice passage 12 of the engine mount 1 is a passage defined by the outer circumferential groove 27 provided on the outer circumferential surface of the circumferential wall 25 of the partition wall 9 and the lower recess 23 of the first wall 7. Namely, the orifice passage 12 is a passage partially defined by the outer circumferential groove 27. The first liquid chamber 10 and the second liquid chamber 11 communicate with each other via the orifice passage 12. The details of the orifice passage 12 will be described later.

<The Function of the Engine Mount 1>

When the engine 2 vibrates, the first wall 7 and the second wall 8 are elastically deformed according to relative displacement between the first attachment member 5 and the second attachment member 6, and thus the volumes of the first liquid chamber 10 and the second liquid chamber 11 change. For example, when the first attachment member 5 descends with respect to the second attachment member 6, the first wall 7 and the second wall 8 are elastically deformed downward. Accordingly, the volume of the first liquid chamber 10 decreases and the volume of the second liquid chamber 11 increases. On the other hand, when the second attachment member 6 ascends with respect to the first attachment member 5, the first wall 7 and the second wall 8 are elastically deformed upward. Accordingly, the volume of the first liquid chamber 10 increases and the volume of the second liquid chamber 11 decreases.

As the volumes of the first liquid chamber 10 and the second liquid chamber 11 change in this way, the mount liquid M flows through the orifice passage 12 between the first liquid chamber 10 and the second liquid chamber 11. For example, when the volume of the first liquid chamber 10 decreases and the volume of the second liquid chamber 11 increases, the mount liquid M flows from the first liquid chamber 10 to the second liquid chamber 11. On the other hand, when the volume of the first liquid chamber 10 increases and the volume of the second liquid chamber 11 decreases, the mount liquid M flows from the second liquid chamber 11 to the first liquid chamber 10. In this way, the mount liquid M flows through the orifice passage 12 between the first liquid chamber 10 and the second liquid chamber 11, so that the vibration of the engine 2 is damped.

<The Mount Liquid M>

In the present embodiment, the mount liquid M is composed only of a non-Newtonian fluid. In another embodiment, the mount liquid M may be composed of both the non-Newtonian fluid and a Newtonian fluid.

Figure 2:
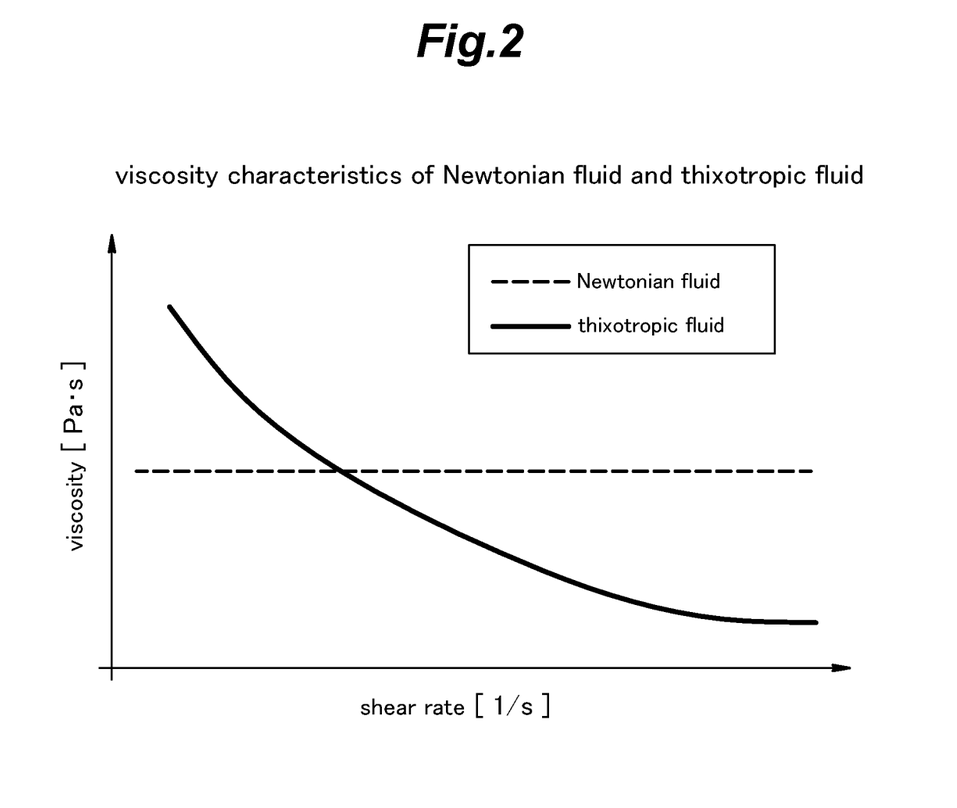
FIG. 2 is a graph showing viscosity characteristics of a Newtonian fluid and a thixotropic fluid.

The non-Newtonian fluid that composes the mount liquid M is a thixotropic fluid. With reference to FIG. 2, the viscosity of the Newtonian fluid is constant regardless of the shear rate of the Newtonian fluid. By contrast, the viscosity of the thixotropic fluid gradually decreases as the shear rate of the thixotropic fluid increases. In another embodiment, a fluid other than the thixotropic fluid (for example, a Bingham fluid) may be used as the non-Newtonian fluid that composes the mount liquid M.

The thixotropic fluid that composes the mount liquid M is formed by mixing a thixotropy imparting agent (hereinafter abbreviated as "thixotropic agent") into a base liquid that is composed of the Newtonian fluid. In another embodiment, the thixotropic fluid that composes the mount liquid M may contain additives in addition to the base liquid and the thixotropic agent.

The base liquid of the thixotropic fluid is formed by dissolving a glycol-based solvent (for example, ethylene glycol or propylene glycol) in water. The ethylene glycol has an effect of lowering the freezing temperature of the water, and also has a relatively low viscosity among solvents having such an effect. Accordingly, the ethylene glycol is preferable as a solvent of the base liquid. In another embodiment, the base liquid may be formed by dissolving a solvent other than the glycol-based solvent in the water or by dissolving a solvent in a liquid other than a water-based liquid (for example, an oil-based liquid).

The thixotropic agent of the thixotropic fluid is composed of an inorganic material (for example, bentonite or silica). The bentonite contains montmorillonite that has an effect of reducing temperature dependency of the characteristics of the thixotropic fluid, and thus is preferable as the thixotropic agent. In another embodiment, the thixotropic agent may be composed of an organic material (for example, a cellulose derivative or a polyether material), or may be composed of a composite material (for example, organic bentonite or calcium carbonate). If the content of the thixotropic agent in the thixotropic fluid is equal to or less than 10% by weight, the thixotropic agent can be evenly dispersed in the entire thixotropic fluid. However, the content of the thixotropic agent in the thixotropic fluid may exceed 10% by weight (for example, 20% by weight).

<The Structure of the Orifice Passage 12>

Figure 3:
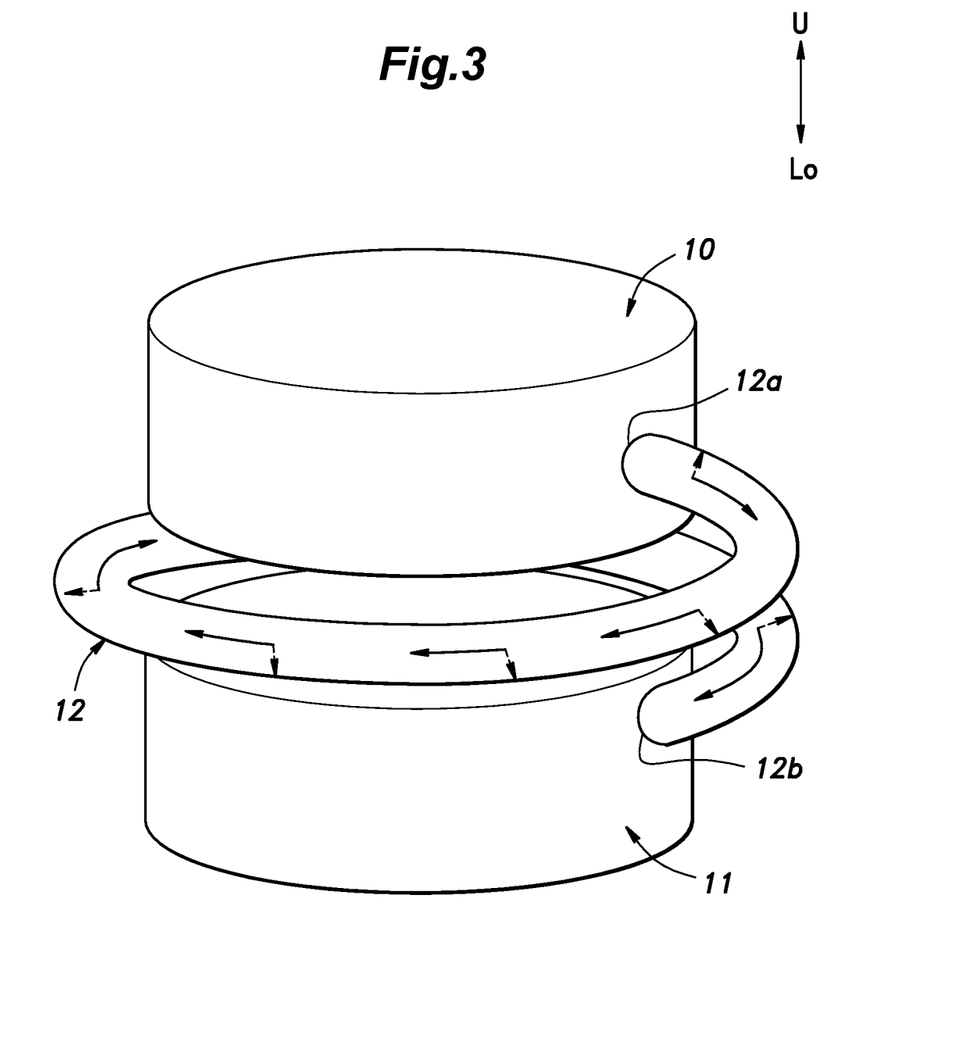
FIG. 3 is a schematic perspective view showing an orifice passage according to the embodiment of the present invention.

With reference to FIG. 3, the orifice passage 12 is curved in an arc shape in the axial direction (the longitudinal direction) thereof. More specifically, the orifice passage 12 is curved in an arc shape over a substantially entire area in the axial direction thereof. In another embodiment, the orifice passage 12 may be only partially curved in an arc shape. The orifice passage 12 is provided spirally. A first end 12a of the orifice passage 12 communicates with the first liquid chamber 10, while a second end 12b of the orifice passage 12 communicates with the second liquid chamber 11. Namely, the orifice passage 12 connects the first liquid chamber 10 and the second liquid chamber 11.

<The Function of the Orifice Passage 12>

As described above, the orifice passage 12 is curved in an arc shape in the axial direction thereof, and thus a centrifugal force is applied to the mount liquid M flowing through the orifice passage 12. Accordingly, not only a primary flow of the mount liquid M (see solid-line arrows in FIG. 3) toward the axial direction of the orifice passage 12 but also a secondary flow of the mount liquid M (see broken-line arrows in FIG. 3) toward an outside in a radial direction of the orifice passage 12 is generated in the orifice passage 12. When the mount liquid M flows through the orifice passage 12, the shear rate of the mount liquid M in a primary flow direction (namely, a direction of the primary flow) becomes larger than that of the mount liquid M in a secondary flow direction (namely, a direction of the secondary flow).

In a case where the mount liquid M is composed only of the Newtonian fluid, the viscosity of the mount liquid M both in the primary flow direction and the secondary flow direction is constant, even if the shear rate of the mount liquid M in the primary flow direction is larger than that of the mount liquid M in the secondary flow direction. Namely, the viscosity of the mount liquid M in the primary flow direction cannot be made lower than that of the mount liquid M in the secondary flow direction. Accordingly, the influence of the secondary flow becomes large, and thus the flow of the mount liquid M is disturbed by the secondary flow and the average flow velocity of the mount liquid M is decreased. More specifically, in a radially inner portion of the orifice passage 12, a low speed area of the mount liquid M is enlarged.

By contrast, in the present embodiment, the mount liquid M contains the thixotropic fluid. Accordingly, if the shear rate of the mount liquid M in the primary flow direction is larger than that of the mount liquid M in the secondary flow direction, the viscosity of the mount liquid M in the primary flow direction becomes lower than that of the mount liquid M in the secondary flow direction. Namely, the viscosity of the mount liquid M becomes anisotropic. Accordingly, the influence of the secondary flow is reduced, so that it is possible to prevent the flow of the mount liquid M from being disturbed by the secondary flow and thus to increase the average flow velocity of the mount liquid M.

<The Effects>

As described above, in the present embodiment, the orifice passage 12 is curved in an arc shape in the axial direction thereof, and the mount liquid M contains the thixotropic fluid. Thus, it is possible to prevent the flow of the mount liquid M from being disturbed by the centrifugal force and thus to sufficiently secure the average flow velocity of the mount liquid M even if the orifice passage 12 is curved. Accordingly, the vibration damping characteristics of the engine mount 1 can be sufficiently exhibited when the liquid column resonance occurs.

Further, the orifice passage 12 is provided spirally, and thus the length of the orifice passage 12 in the axial direction can be secured more easily as compared with a case where the substantially entire orifice passage 12 is provided on the same plane. Accordingly, the vibration damping effect of the engine mount 1 can be enhanced.

Further, the orifice passage 12 is curved in an arc shape over a substantially entire area in the axial direction thereof. Thus, the length of the orifice passage 12 in the axial direction can be secured more easily as compared with a case where the orifice passage 12 is only partially curved in an arc shape. Accordingly, the vibration damping effect of the engine mount 1 can be further enhanced.

Further, the engine mount 1 includes the elastically deformable first wall 7 partially defining the first liquid chamber 10 and configured to support the first attachment member 5, the elastically deformable second wall 8 partially defining the second liquid chamber 11 and attached to the second attachment member 6, and the partition wall 9 coupled to the first wall 7 so as to separate the second liquid chamber 11 from the first liquid chamber 10 and provided with the orifice passage 12. Accordingly, the vibration damping effect of the engine mount 1 can be enhanced.

Further, the orifice passage 12 is partially defined by the outer circumferential groove 27 provided on the outer circumferential surface of the partition wall 9. Thus, the length of the orifice passage 12 in the axial direction can be secured more easily as compared with a case where the orifice passage 12 is provided in an inner circumferential portion of the partition wall 9. Accordingly, the vibration damping effect of the engine mount 1 can be further enhanced.

Further, the non-Newtonian fluid that composes the mount liquid M is the thixotropic fluid. Thus, the viscosity of the non-Newtonian fluid can be gradually decreased as the shear rate increases. Accordingly, it is possible to prevent the vibration damping characteristics of the engine mount 1 from changing sharply.

<The Modifications>

Figure 4:
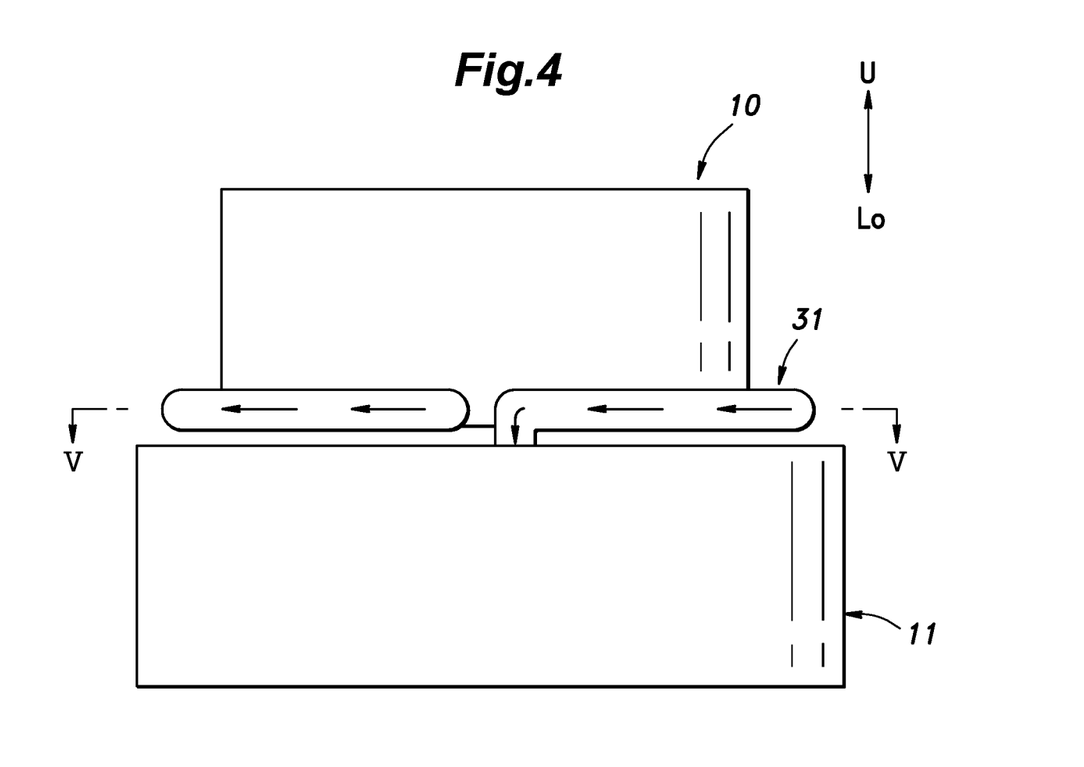
FIG. 4 is a schematic side view showing an orifice passage according to another embodiment of the present invention.
Figure 5:
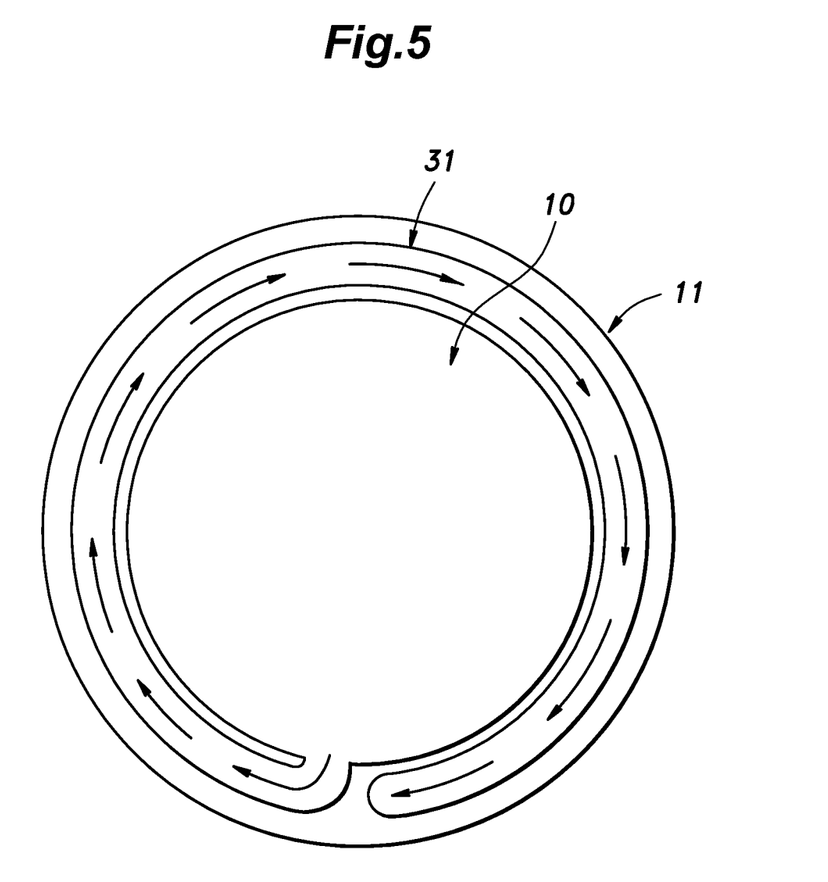
FIG. 5 is a sectional view taken along a line V-V of FIG. 4.

In the above embodiment, the orifice passage 12 is provided spirally. In another embodiment, as shown in FIGS. 4 and 5, the orifice passage 31 may be provided substantially annularly and thus the substantially entire orifice passage 31 may be provided on the same plane. According to this arrangement, the installation space of the orifice passage 31 can be reduced as compared with a case where the orifice passage 12 is provided spirally. Accordingly, it is possible to make the engine mount 1 compact.

Figure 6:
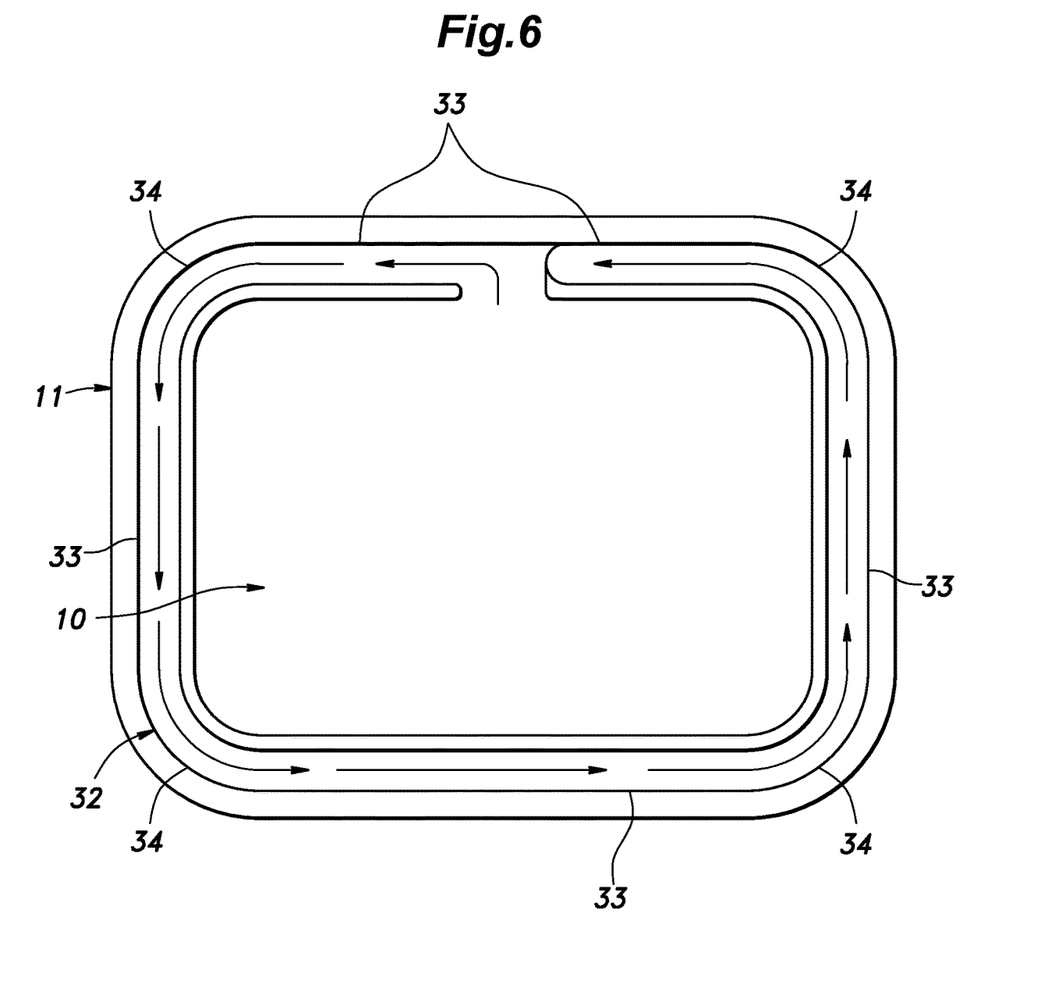
FIG. 6 is a schematic sectional view showing an orifice passage according to still another embodiment of the present invention.

In the above embodiment, the orifice passage 12 is curved in an arc shape over the substantially entire area in the axial direction thereof. In another embodiment, as shown in FIG. 6, the orifice passage 32 may be formed by combining straight sections 33 (namely, sections extending straight in the axial direction of the orifice passage 32) and curved sections 34 (namely, sections curved in an arc shape in the axial direction of the orifice passage 32). In such a case, the above-mentioned effects may be exhibited in the curved sections 34.

In the above embodiment, the engine mount 1 that supports the engine 2 is provided as an example of the vibration damping device for a vehicle. In another embodiment, a motor mount that supports a motor may be provided as an example of the vibration damping device for a vehicle, or a shock absorber used for a suspension may be provided as an example of the vibration damping device for a vehicle. Namely, the vibration damping device for a vehicle according to the present invention can be applied to any place in a vehicle where the vibration should be damped.

Concrete embodiments of the present invention have been described in the foregoing, but the present invention should not be limited by the foregoing embodiments and various modifications and alterations are possible within the scope of the present invention.

The invention claimed is:

1. A vibration damping device for a vehicle, comprising:
a first attachment member attached to a first member;
a second attachment member attached to a second member;
a first liquid chamber and a second liquid chamber configured to change volumes according to relative displacement between the first attachment member and the second attachment member;
an orifice passage configured to cause a liquid to flow between the first liquid chamber and the second liquid chamber according to changes in the volumes of the first liquid chamber and the second liquid chamber;
an elastically deformable first wall partially defining the first liquid chamber and configured to support the first attachment member;
an elastically deformable second wall partially defining the second liquid chamber and attached to the second attachment member; and
a partition wall coupled to the first wall so as to separate the second liquid chamber from the first liquid chamber and provided with the orifice passage,
wherein the orifice passage is curved at least partially in an axial direction thereof,
the liquid contains a non-Newtonian fluid whose viscosity decreases as a shear rate increases,
the second wall consists of a diaphragm, and
the partition wall includes a cylindrical circumferential wall and a bottom wall that is in contact with the second wall and covers an end of the circumferential wall on a side of the second liquid chamber.

2. The vibration damping device according to claim 1, wherein the orifice passage is provided spirally.

3. The vibration damping device according to claim 1, wherein the substantially entire orifice passage is provided on a same plane.

4. The vibration damping device according to claim 1, wherein the orifice passage is curved over a substantially entire area in the axial direction thereof.

5. The vibration damping device according to claim 1, wherein the orifice passage is partially defined by an outer circumferential groove provided on an outer circumferential surface of the partition wall.

6. The vibration damping device according to claim 1, wherein the non-Newtonian fluid is a thixotropic fluid.

7. The vibration damping device according to claim 1, wherein the liquid is composed only of the non-Newtonian fluid.

8. The vibration damping device according to claim 1, wherein the liquid is composed of both the non-Newtonian fluid and a Newtonian fluid.

* * * * *